THOMAS SYMONDS.
Improvement in Excavators.
No. 114,878. Patented May 16, 1871.
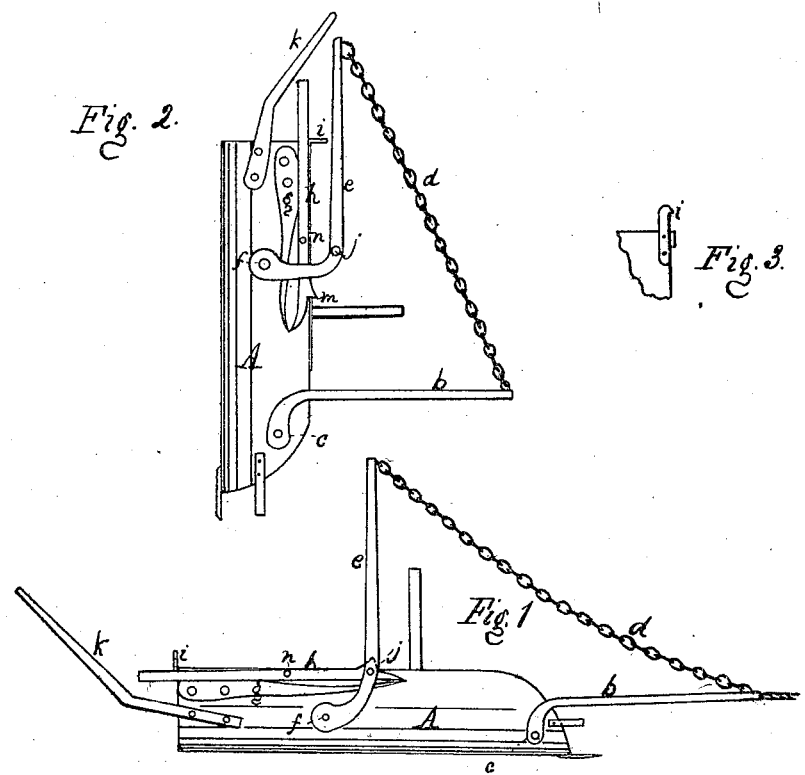

United States Patent Office.

THOMAS SYMONDS, OF PORTLAND, MAINE.

Letters Patent No. 114,878, dated May 16, 1871.

IMPROVEMENT IN EXCAVATORS.

The Schedule referred to in these Letters Patent and making part of the same.

*To all whom it may concern:*

Be it known that I, THOMAS SYMONDS, of Portland, in the county of Cumberland and State of Maine, have invented a new and useful improved Excavator; and I hereby declare the following to be a full, clear, and exact description thereof, which will enable others to make and use my invention, reference being had to the accompanying drawing forming part of this specification, in which—

Figure 1 is a side elevation.

Figure 2, the same in a different position.

Figure 3, a detail of the hooks to hold the end of the arm *h*.

My invention relates to an improved device for excavating earth, and has for its particular object an improved device for emptying or discharging the earth from the scoop or shovel when the same is once filled.

My scoop or shovel is suspended in a support or derrick, as is common.

The scoop is placed in position on the earth, and then, by proper machinery, drawn along the earth, and scoops up the soil.

When the operation is completed, the scoop is then raised and swung around to where the earth in the scoop is to be emptied, and then, by a certain device, the scoop is allowed to trip, and the earth is discharged where desired.

Reference to the drawing will better explain the invention.

A is the scoop.

*b*, the arms by which it is drawn along the earth. These are pivoted to the forward end of the scoop, at *c*, so that the position of the arms relatively to the scoop may be changed, as illustrated in the two figures.

*d* is a chain extending from *b* to the arms *e*. These arms are so pivoted to the scoop A as to allow them motion, as seen in the two figures.

*h* is an arm, pivoted at *n*, and having the shoulder *m*. There are two of these arms, one on each side of the scoop, as there are also two springs, *g*.

*j* is a pin on the arm *e*, which, when the said pin is forward of the shoulder *m*, keeps the arm *e* upright, as shown in fig. 1.

When *h* is drawn down, so that the pin *j* will slip over *m*, then *e* will be in the position seen in fig. 2. This results from the scoop tipping forward, as in fig. 2.

The shoulder *m* is drawn down so as to allow the pin *j* to slip over it, by drawing upon the back end of *h*. To do this there is a cord extending from the rear end of *h* up to the cross-piece of the frame, support, or derrick on which the whole scoop is suspended.

When the strain of the cord is removed the spring *g* will throw the forward end of *h* up again, and, the pin *j* slipping over it, *e* is again held in an upright position.

*e* is drawn forward to the upright position by the draft of the rope or chain on *b*, connected to the power applied to the scoop.

This rope or chain will draw *b* down to a horizontal position, as seen in fig. 1, and, consequently, with it, will draw *e* up to the vertical position, and throw the pin *j* over the shoulder *m*.

The operation is as follows:

The scoop is placed on the earth, the power is applied, and it is drawn into the soil, being directed by the handle *k*, until it is filled. It is then raised by the rope attached to the top of *e*.

When raised and swung to the proper position the rope attached to the rear end of *h* is drawn up. This releases the pin *j* on the shoulder *m*, and the scoop tips, as in fig. 2, and discharges its contents. It is then lowered, and the filling again begun.

When power is applied to fill it again, *b* is drawn down horizontally, and *e* up to a vertical position, the pin *j* slipping over the shoulder *m*, and the same process as above is repeated.

What I claim as my invention, and desire to secure by Letters Patent, is—

The combination of the pivoted arm *b*, chain *d*, arm *e* with pivot and pin *j*, arm *h*, with spring *g*, and shoulder *m*, arranged and applied as herein set forth.

THOMAS SYMONDS.

Witnesses:
W. H. CLIFFORD,
WM. FRANKLIN SEAVEY.